Dec. 27, 1966   R. S. KUSS   3,293,971
TEMPLATE PRODUCER
Filed June 23, 1965   4 Sheets-Sheet 1
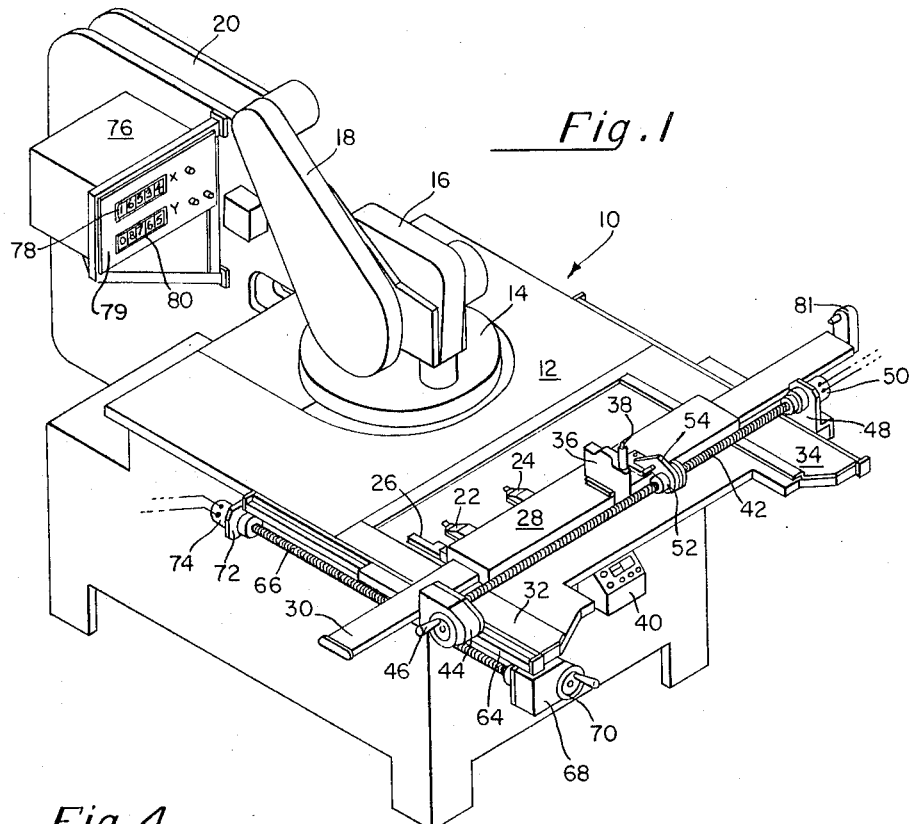
Fig. 1
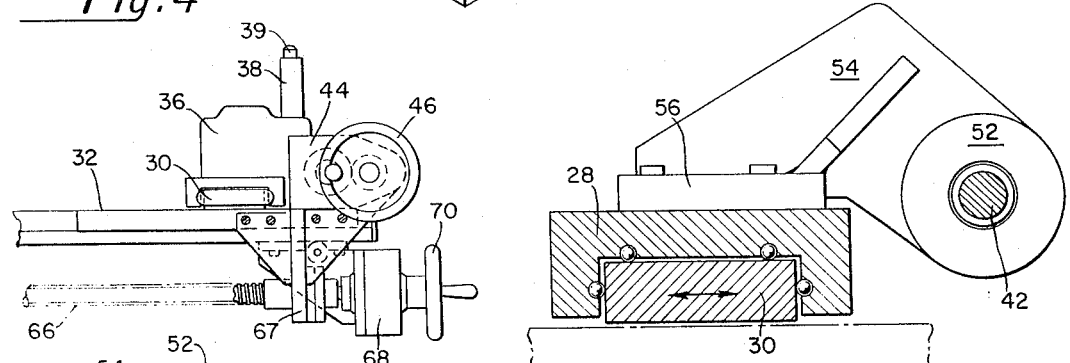
Fig. 4
Fig. 6
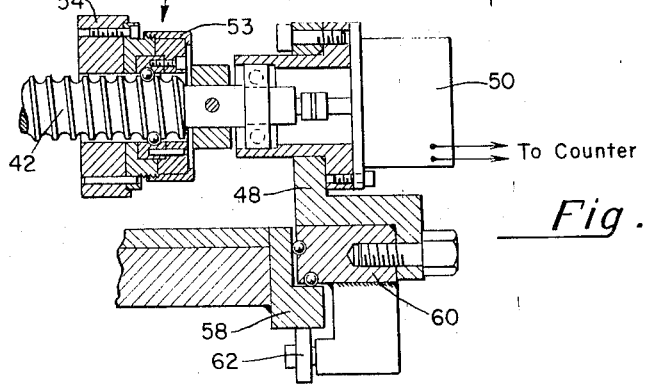
Fig. 5
INVENTOR.
ROBERT S. KUSS
BY Seidel & Gonda
ATTORNEYS Dec. 27, 1966  R. S. KUSS  3,293,971
TEMPLATE PRODUCER
Filed June 23, 1965  4 Sheets-Sheet 2

INVENTOR.
ROBERT S. KUSS
BY
Seidel & Gonda
ATTORNEYS

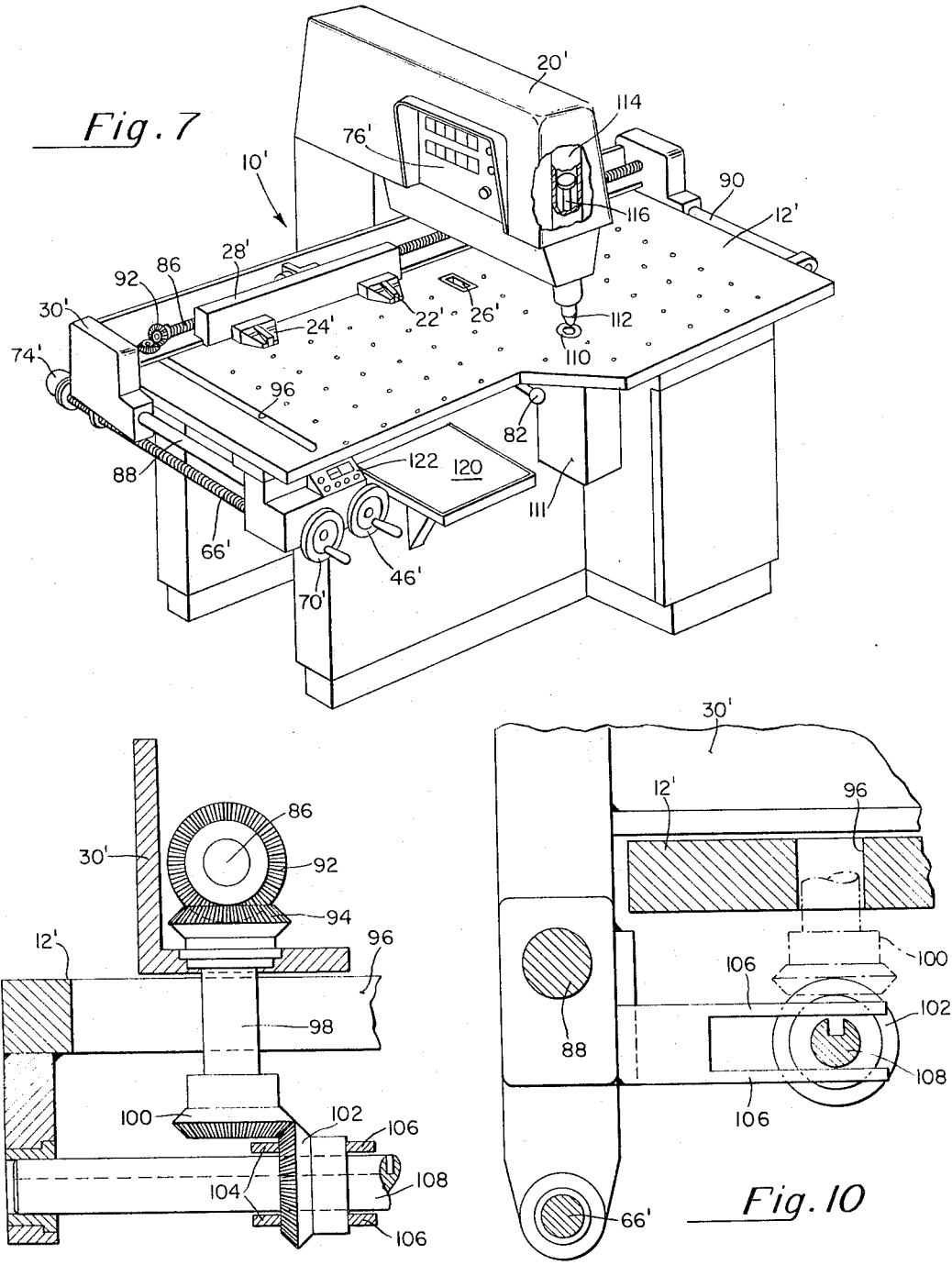

Dec. 27, 1966  R. S. KUSS  3,293,971
TEMPLATE PRODUCER
Filed June 23, 1965  4 Sheets-Sheet 4
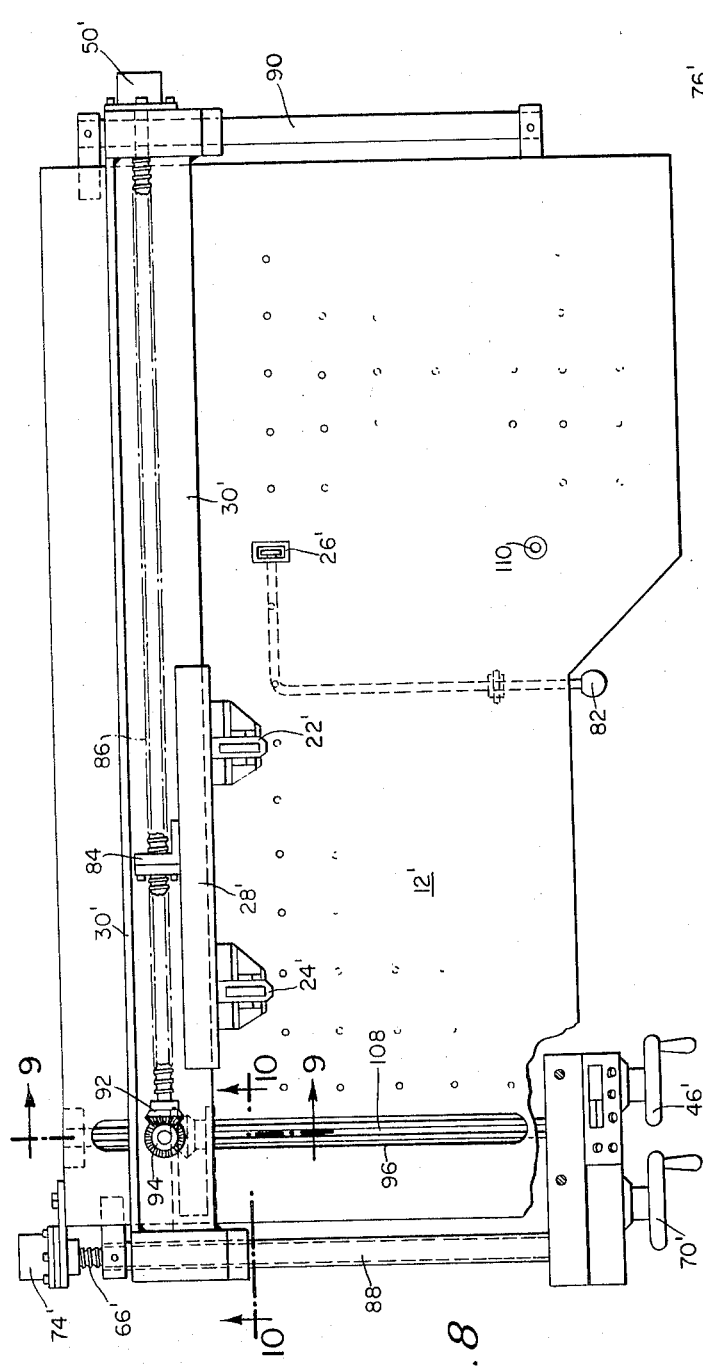
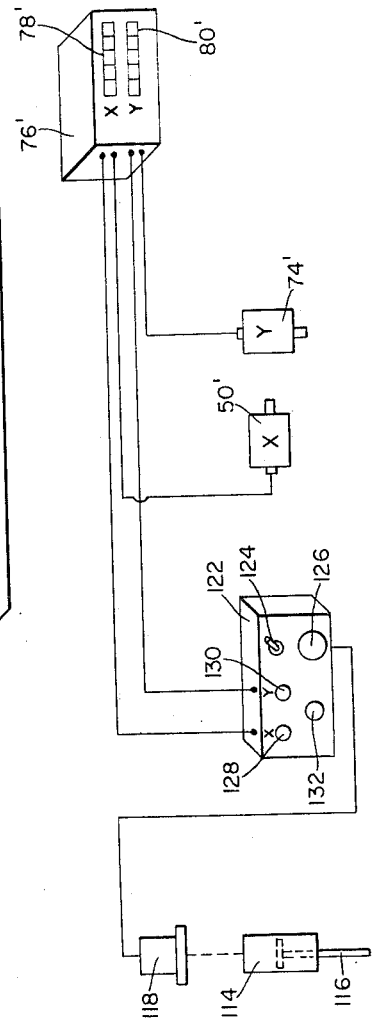
Fig. 8
Fig. 11
INVENTOR.
ROBERT S. KUSS
BY
ATTORNEYS 3,293,971
TEMPLATE PRODUCER
Robert S. Kuss, Broomall, Pa.
(1020 Ford St., West Conshohocken, Pa. 19428)
Filed June 23, 1965, Ser. No. 466,332
5 Claims. (Cl. 83—412)

This invention relates to a template producer, and more particularly, to apparatus for making sheet metal templates with means provided for direct reading digital display.

The template producer of the present invention is a direct reading device which when installed on a standard stylus follower type punch press which is common in the sheet metal industry, it will produce templates for use on various sheet metal working machinery. Heretofore, sheet metal templates were normally made by hand layout which involved a large amount of time and produced templates of questionable accuracy. The temple producer of the present invention reduces the operation of making templates to a quick, easy and accurate mehod of manufacture. In addition, the template producer of the present invention may be used to make short runs of parts without the need for a template. Other systems for template manufacture in existence today are either very costly or time-consuming.

The template producer of the present invention is based on the coordinate axis system, with movement being made in the "X" and "Y" directions. Both axes are identical in basic operation. A typical axis mechanism may comprise a precision ball bearing screw, handwheel operated through a two-speed gear case, a digital encoder coupled to the screw. The encoder counts the revolutions made by the ball bearing screw. By computing the screw revolutions with respect to carriage movement, the encoder sends pulses to a bi-directional counter. The counter is a device which allows direct read-out, in inches or other dimensions, of the position of the stylus carriage with respect to an established axis or known position on the press bed thereby resulting in a known position for punching a hole in a template. By clamping a template blank onto the stylus carriage, and moving the carriage by means of the axis mechanisms, holes may be punched into the template by the punch press at coordinated positions indicated by the counter.

More specifically, the apparatus of the present invention comprises a carriage reciprocally supporting a cross slide with a first lead screw coupled to the carriage. A second lead screw is coupled to the cross slide and is disposed substantially perpendicular to said first screw. A separate digital encoder is coupled to each lead screw for generating a signal representative of the position of the cross slide and carriage. Each encoder is coupled to a bi-directional counter which receives the signals and indicates the position of the cross slide and carriage with respect to any given zero point or axis.

It is an object of the present invention to provide a novel template producer.

It is another object of the present invention to provide a template producer of the punch press type which is simple, inexpensive, accurate and reliable.

It is another object of the present invention to provide a template producer which is a direct reading device.

It is another object of the present invention to provide a template producer which will facilitate the manufacture of parts in small quantity runs without the need for a template or other locating device.

It is another object of the present invention to provide an apparatus and method for making a master template in a faster manner and more accurate than those proposed heretofore.

It is another object of the present invention to provide a direct reading digital display template producer which eliminates troublesome vernier scale or optical system line-up.

It is another object of the present invention to provide a novel template producer which is low in initial cost, low cost in operation, and does not require skilled personnel to produce accurate templates with great speed.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a perspective view of a commercially available stylus type punch press which has been modified in accordance with the present invention.

FIGURE 4 is an elevation view taken along the line 4—4 in FIGURE 2.

FIGURE 5 is a sectional view taken along the line 5—5 in FIGURE 2.

FIGURE 6 is a sectional view taken along the line 6—6 in FIGURE 2.

FIGURE 7 is a perspective view of a template producer in accordance with the present invention, but illustrating another embodiment.

FIGURE 8 is a plan view of the table portion of the apparatus in FIGURE 7.

FIGURE 9 is a sectional view taken along the line 9—9 in FIGURE 8.

FIGURE 10 is a sectional view taken along the line 10—10 in FIGURE 8.

FIGURE 11 is a schematic illustration of a wiring diagram for the apparatus in FIGURES 7-10.

Referring to the drawing in detail, wherein like numerals indicate like elements, there is shown in FIGURE 1 a stylus follow type punch press designated generally as 10.

Figure 2:
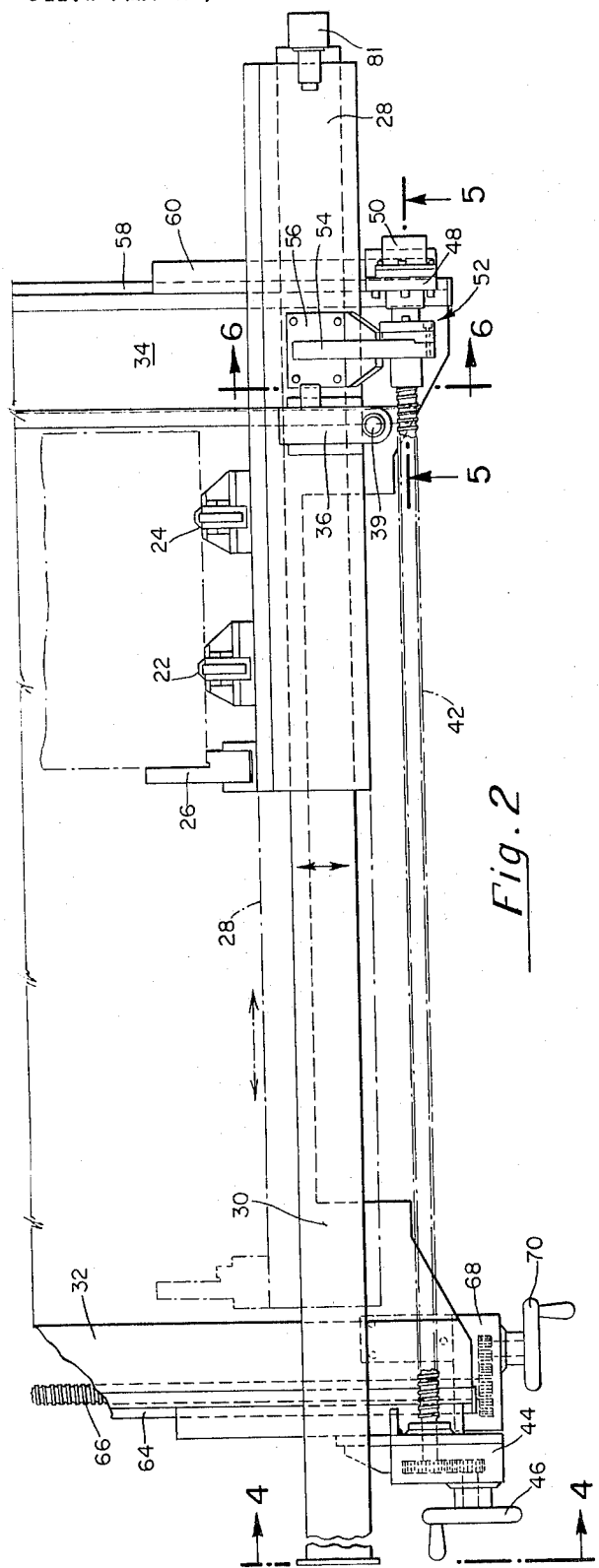
FIGURE 2 is a top plan view, on an enlarged scale, of the righthand and of the apparatus shown in FIGURE 1.
Figure 3:
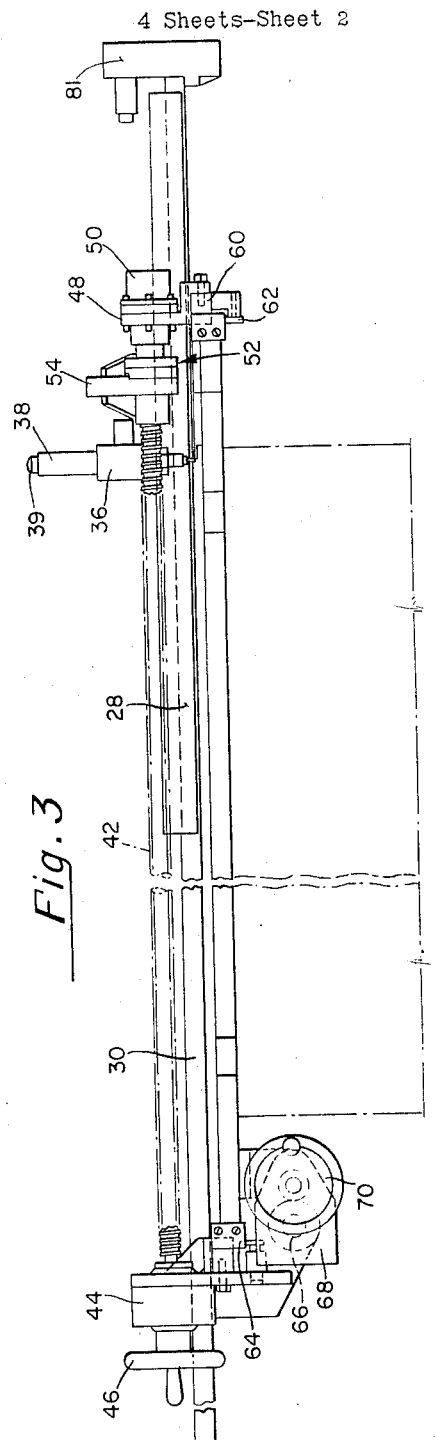
FIGURE 3 is a front elevation view of the apparatus shown in FIGURE 2.

The punch press 10 includes a table 12 and has a head 14 suspended from a support 16. The support 16 is connected to a frame 20. The table 12 is mounted on, and supported by, the frame 20. A casing 18 is provided to enclose the movable components which include a motor and eccentric drive for selectively actuating one of the punches supported by the head 14.

That portion of the press 10 described above is conventional and commercially available and per se forms no part of the present invention. The press 10 includes a pair of spaced clamps 22 and 24 orientated with respect to a zero surface 26 and mounted on a cross slide 28. Cross slide 28 is slidably supported by a carriage 30. The carriage 30 is disposed above the plane of the table 12 which is provided with extension portions 32 and 34.

The cross slide 28 is provided with a handle 36 and a stylus pin 38 containing a button 39 coupled to a control panel 40.

A precision lead screw 42 is supported so that it extends transversely across the press 10. The lefthand end of screw 42 in FIGURE 2 is supported by a gear case 44 having an input handwheel 46. The handwheel 46 is geared to the screw 42. The opposite end of screw 42 is supported by a bracket 48.

A digital encoder 50 is connected to the screw 42 at the right hand end thereof in FIGURE 2. Encoder 50 may be an Incrosyn non-contact, incremental shaft encoder especially designed for digital control and readout. It preferably has a wide range of resolution which allows direct conversion of shaft position to final readout format. Encoders are commercially available from Data Technology, Inc., of Watertown, Massachusetts which have low noise susceptibility, high reliability, long life and low power while eliminating such typical encoder problems as brush wear, lamp burnout and instability. Hereinafter, encoder 50 may be referred to as X axis digital encoder and screw 42 may be referred to as X axis screw.

A ball nut 52 is releasably coupled to a support bracket 54 by means of a threaded sleeve 53. Any one of a variety of devices may be utilized to removably couple the ball nut 52 to the bracket 54. Bracket 54 is connected to a plate 56 which in turn is removably coupled to the cross slide 28. Since the ball nut 52 is meshed with the threads on screw 42, rotation of screw 42 moves the cross slide 28 along the carriage 30. The particular position of the cross slide 28 will be indicated, as will be made clear hereinafter, as a function of the signals emitted by the encoder 50. Thus, any fixed number of rotations of the screw 42 will move the cross slide 28 from any particular zero point a specified distance and encoder 50 will emit signals as a function of the number of revolutions of the screw 42 to accomplish such movement. For example, the encoder 50 may emit 100 pulses for every revolution of the screw 42 and it may take 10 revolutions of the screw 42 to move the cross slide 28 a total distance of 1 inch.

As shown more clearly in FIGURE 2, the bracket 48 is supported for movement along a way 58 on the side of the press 10. As shown more clearly in FIGURE 5, the bracket 48 is affixed to a slide 60 which has a ball bearing rolling support on the upper surface of the way 58 and a roller 62 on a lower surface thereof. A corresponding way 64 and support means is provided at the opposite end of screw 42. A second lead screw 66 is provided. Lead screw 66 is perpendicular to lead screw 42. The righthand end of lead screw 66 is supported by a gear case 68. Screw 66 is coupled through gears in gear case 68 to a handwheel 70.

Lead screw 66 may be referred to hereinafter as a Y axis screw. Screw 66 extends through and is threadedly coupled to a bracket 67 which is connected to the gear case 44. Hence, turning of handwheel 70 will rotate screw 66 and cause reciprocation or movement of the "X" axis mechanism along the ways 58 and 64. The X axis mechanism includes the carriage 30, cross slide 28, screw 42, encoder 50, etc.

The end of screw 66 remote from handwheel 70 is supported by a bracket 72 and has coupled thereto an encoder 74. Encoder 74 may be referred to as a Y axis digital encoder and is identical with encoder 50. The encoders 50 and 74 are electrically coupled to a direct readout bidirectional counter 76 supported by the frame 20. Counter 76 has an X numerical readout indicator 78 and a Y numerical readout indicator 80 mounted on panel 79. Counter 76 is preferably provided with a zero reset and may be of a type commercially available from the Data Technology, Inc., Watertown, Massachusetts.

The button 39 of the firing mechanism is coupled by means of a flexible coiled conduit, not shown, to an electrical socket 81, best seen in FIGURE 1. The socket 81 is supported at the righthand end of the carriage 30. The socket 81 in turn is electrically coupled by way of a flexible coiled conduit, not shown, to the control panel 40.

The press 10 may be utilized in a conventional manner by merely disconnecting the sleeve 53. When used in a conventional manner, a blank will be supported by the clamps 22 and 24. The operator need only move the cross slide 28 by gripping the handle 36 until the pin 38 fits into a hole in a master template, not shown. Thereafter, the operator presses on the firing button 39 which will cause a punch supported by head 14 to perforate the blank.

When it is desired to make master patterns with the press 10, the ball nut 52 is coupled to the bracket 54.

With the cross slide 28 in a zero position, the indicators 78 and 80 will read zero. The operator will be provided with instructions whereby he will turn one or both of the handwheels 46 and 70 until a particular sequence of numbers appears on indicators 78 and 80. Thereafter, the firing button 39 will be pressed to cause a punch on head 14 to perforate the blank. The zero orientation surface 26 is preferably provided so that the blank may be perforated along a side edge so as to provide a notch. In order to accomplish the particular sequence of numbers on the indicators 78 and 80 of the counter 76, the encoders 50 and 74 will transmit pulses to the counter 76 as a function of the number of turns of the X and Y screws 42 and 66 respectively.

As soon as the operator has caused the first hole to be punched in the blank, he then manipulates the handwheels 46 and 70 until the next desired sequence of numbers appears on the indicators 78 and 80. Thereafter, the firing button 39 is again depressed to cause a punch on the head 14 to perforate the blank. These operations are repeated sequentially until the blank has been provided with the desired number of perforations in the proper location thereby producing a template.

At any desired time, a reset button on the control panel 40 may be depressed to reset the indicators 78 and 80 to zero. This will occur when it is desired to produce the next template or may be accomplished wherever it is desired to start a new reference point. That is, any previously punched hole may constitute a new reference point thereby providing versatility.

In FIGURES 7–11, there is illustrated another embodiment of the present invention designated generally as 10'. The template producer 10' is a punch press which integrally includes the novel features described above as an integrated machine. The press 10' is identical with the press 10 except as will be made clear hereinafter. Hence, corresponding structure is provided with corresponding primed numerals.

In the press 10', the table 12' is provided with a plurality of balls on its upper surface to facilitate the ease with which parts may be moved thereon. The orientation surface 26' is mounted for movement into and out of the table 12'. Movement upwardly to facilitate orientation is obtained by manipulation of an actuator rod 82.

A lead screw 86, corresponding to lead screw 42 is provided. Lead screw 86 is coupled to the cross slide 28' by means of a bracket 84. An encoder 50' is provided at one end of the lead screw 86. At the other end of lead screw 86, there is provided a beveled gear 92 which is meshed with a beveled gear 94. Beveled gear 94 is mounted on an upright shaft 98 extending through a slot 96 in the table 12. Slot 96 extends perpendicular to the longitudinal axis of lead screw 86.

A beveled gear 100 is secured to the lower end of shaft 98. Gear 100 is in meshing engagement with beveled gear 102. Beveled gear 102 is coupled to a splined shaft 108 and mounted for sliding movement therealong. Such sliding movement may be accomplished by pairs of bracket fingers 104 and 106 supported by one end of the carriage 30'. The carriage 30' is mounted for movement along the ways 88 and 90 by means of the handwheel 70'.

The table 12' is provided with a die 110 located above a slug collection box 111. The center of the die 110 is in line with the orientation surface 26' so that the edge of the blank may be provided with a notch. A punch 112 is mounted for movement toward and away from the die 110 and supported by the frame 20'. The frame 20' supports a cylinder 114 having therein a piston coupled to the punch 112 by means of a piston rod 116. Motive fluid to the cylinder 114 is controlled by a solenoid 118 on a valve. The machine 10' is provided with a platform 120 on which the operator's instructions may be supported and adjacent the handwheels 46' and 70' there is provided a control panel 122.

As shown more clearly in FIGURE 11, the encoders 50' and 74' are coupled to the counter 76' which in turn is coupled to the control panel 122. The control panel 122 is provided with an on-off switch 124 as well as a pushbutton 126. When button 126 is pushed, solenoid 118 is activated to open a valve to permit motive fluid to enter cylinder 114 to move the piston rod 116 downwardly and thereby cause the punch 112 to perforate the blank. Control panel 122 is also provided with an X reset button 128, a Y reset button 130, and an X-Y reset button 132.

Otherwise, the press 10' is identical with the press 10. The operation of the press 10' is identical with the operation described above wherein the ball nut 52 is coupled to the flange bracket 54. Accordingly, it is not deemed necessary to repeat the description of operation.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a table, a frame, said table being mounted on said frame, ways on said table, a carriage, said ways slidably supporting said carriage, a cross slide reciprocally supported by said carriage, a first lead screw coupled to said carriage, a second lead screw coupled to said cross slide, said second lead screw being substantially perpendicular to said first lead screw, a slot in said table extending substantially parallel to said ways, said second lead screw being mechanically coupled to a member extending in said slot, said member being coupled to a gear slidably disposed on a shaft and coupled to the shaft in a manner to facilitate transmission of rotary motion from said shaft to said member, a separate digital encoder coupled to each lead screw for generating a signal representative of the number of rotations of the screw from a zero point to thereby indicate the position of the cross slide and carriage, and a bidirectional counter for receiving said signals and directly indicating the position of said cross slide and carriage with respect to a given zero point.

2. Apparatus comprising a carriage reciprocally supporting a cross slide, a first lead screw coupled to said carriage, a second lead screw coupled to said cross slide, said second lead screw being substantially perpendicular to said first lead screw, a separate digital encoder coupled to each lead screw for generating a signal representative of the number of rotations of the screw from a zero point to thereby indicate the position of the cross slide and carriage, a bidirectional counter for receiving said signals an directly indicating the position of said cross slide and carriage with respect to a given zero point, an orientation surface mounted for movement into and out of said table, and means for selectively moving said surface.

3. Apparatus comprising a table, a frame, said table being supported by said frame, a carriage slidably supported by said table, said carriage reciprocally supporting a cross slide, a first lead screw coupled to said carriage, a second lead screw coupled to said cross slide, said second lead screw being substantially perpendicular to said first lead screw, a punch supported for movement toward and away from said table, a control station supported by said frame, means at said control station for causing said punch to move toward the table to perforate a blank disposed on said table, a separate digital encoder coupled to each lead screw for generating a signal representative of the number of rotations of the screw from a zero point to thereby indicate the position of the cross slide and carriage, a counter for receiving said signals, first and second position indicators on said counter and corresponding to said first and second lead screws, means supporting said counter so that said position indicators are visible to an operator at said control station, and means coupling said respective position indicators to said respective lead screws so that said position indicators provide the operator with an instantaneous indication visible from the control station.

4. Apparatus in accordance with claim 3 wherein said punch is supported by said frame, said cross slide including means for moving the blank with respect to said table.

5. Apparatus in accordance with claim 3 wherein said counter includes a display panel, said first and second position indicators being disposed on said panel.

References Cited by the Examiner
UNITED STATES PATENTS

| | | | |
|---|---|---|---|
| 2,810,520 | 10/1957 | Paulsen | 235—103 X |
| 2,812,816 | 11/1957 | Hoffman | 83—412 |
| 2,865,103 | 12/1958 | Lolley et al. | 235—103 X |
| 2,958,247 | 11/1960 | Levine | 83—413 X |
| 3,212,194 | 10/1965 | Brault. | |
| 3,225,636 | 12/1965 | Schott et al. | 83—522 X |

ANDREW R. JUHASZ, *Primary Examiner.*

WILLIAM W. DYER, JR., J. M. MEISTER,
*Assistant Examiners.*